US006139429A

United States Patent [19]

Shoemaker, Jr.

[11] Patent Number: 6,139,429

[45] **Date of Patent: *Oct. 31, 2000**

[54] VIDEO CRANE GAME

[76] Inventor: Stephen P. Shoemaker, Jr., 140 The Village #401, Redondo Beach, Calif. 90277

[ * ] Notice: This patent is subject to a terminal disclaimer.

[21] Appl. No.: 09/394,229

[22] Filed: Sep. 13, 1999

Related U.S. Application Data

[63] Continuation of application No. 08/871,852, Jun. 4, 1997, Pat. No. 5,967,892.

[51] Int. Cl.[7] ...................... A63F 13/00

[52] U.S. Cl. ...................... 463/7; 463/37; 273/448; 273/454; 345/156

[58] Field of Search ...................... 463/7, 5, 36, 37, 463/49, 50, 51, 52, 53, 54, 55, 56, 57; 273/148 B, 440, 447, 448, 454; 345/156, 179, 180, 181, 182, 183

[56] References Cited

U.S. PATENT DOCUMENTS 5,967,892 10/1999 Shoemaker, Jr. ...................... 463/7

*Primary Examiner*—Valencia Martin-Wallace
*Assistant Examiner*—John Paradiso
*Attorney, Agent, or Firm*—Hickman Stephens Coleman & Hughes, LLP

[57] ABSTRACT

A video crane game including a display device, such as a video screen, for displaying images. A mechanical crane-like device provided over the display device includes an x-y assembly for allowing a player to control the movement of a selection head in an x-y plane. A z-movement device causes the selection head to move in a z-direction toward and away from the images of the display device. A sensor detects a location of the selection head with respect to the images displayed on the display device when the head is moved just above or contacts the display. A game controller controls the display of the images and determines a game outcome based on the location of the selection head with respect to the displayed images. The displayed images may include multiple selectable image targets, such as prize images associated with a prize, penalty areas, or images associated with a point score. A dispenser dispensing an award to a player of the game apparatus, such as tickets or prizes.

21 Claims, 7 Drawing Sheets

VIDEO CRANE GAME

CROSS-REFERENCE TO RELATED APPLICATIONS

This application is a continuation of application Ser. No. 08/871,852, now U.S. Pat. No. 5,967,892, filed Jun. 4, 1997, the disclosure of which is incorporated herein by reference.

BACKGROUND OF THE INVENTION

1. Field of the Invention

This invention relates to arcade games, and more particularly to video-mechanical arcade games in which a player controls a mechanical apparatus to achieve goals in the game.

2. Background of the Related Art

Crane-type or "claw machine" arcade games are popular amusement devices often provided in game arcades, stores, or other public places. In these types of games, physical prize objects are placed on a floor within a closed housing and are viewable by a player through transparent glass or the like. Upon the insertion of a coin, the player controls a mechanical claw or other grasping implement with controls such as a joystick, buttons, or toggle switch. Typically, the claw is provided above the prize objects and the player can change the position of the claw over the prizes. The claw is lowered towards the prizes by either a controller such as a computer or the player. The claw is either automatically opened and closed when it reaches the level of the prizes or is opened and closed under the player's control, after which the closed claw is automatically elevated. The claw may or may not have grasped a prize and hold onto the prize as the claw is raised. The controller moves the claw over to a dispensing container and opens the claw, allowing the prize (if any is held) to drop into a dispensing chute and to the player.

The claw pick-up games of the prior art have some distinct disadvantages. The prizes that the operator of a claw-type crane game provides in the game are usually inexpensive items such as small stuffed dolls, rubber items, or containers with small prizes in them. Thus, the operator is usually quite limited in the types of prizes that can be offered, both because of size and cost limitations for those prizes that can be positioned in the limited space of the prize area, and because of the size and other characteristics of prizes that are required for the claw to be able to pick up the prizes. Players thus may grow tired of the game due to lack of variety of available prizes.

In addition, the operator must continually maintain the prize selection in each offered crane game. Thus, for example, if one type of popular prize is continually picked up and dispensed to players, the operator must supervise the prize areas of the games to ensure that at least some of these popular prizes are available to attract additional players. These limitations of prizes in prior art crane games tend to increase maintenance and decrease player involvement, thus leading to less revenue for the game owner.

SUMMARY OF INVENTION

The present invention provides an video crane game apparatus amd method. The game described herein leads to a more interesting and varied game for players and a low maintenance and flexible game for operators.

More specifically, the game apparatus of the present invention includes a display device, such as a video screen, for displaying images. A mechanical crane device, preferably provided over the display device, includes an x-y assembly having a carriage moveable in an x-y plane by at least two actuators. A selection head is coupled to the carriage by a line and is moved in a parallel x-y plane when the carriage is moved. A z-movement device is included for causing the head to move in a z-direction toward and away from the images of the display device; for example, a motor can wind and unwind the line on a spool. A sensor is provided for detecting a location of the head with respect to the images displayed on the display device. A game controller controls the display of the images and determines a game outcome based on the location of the selection head with respect to the images displayed by the display device.

In one embodiment, the sensor includes an optical detector postioned in the head. The game controller determines the location of said head by determining which portion of an image was displayed on the video screen when the optical detector senses electromagnetic radiation, such as light, from the video screen. In another embodiment, the video screen is a touch screen sensing the location of a contact of the head on the screen using a grid of conductive lines on the screen. A control device, such as a joystick, allows a player of the game apparatus to control the movement of the carriage in the x-y plane to control the position of the head over the display device. A dispenser is preferably included for dispensing an award to a player of the game apparatus, such as tickets or prizes.

The displayed image preferably includes a target field including multiple image targets that are selectable by the selection head when the head is moved along the z-axis to a point at or near the video screen. The targets may include prizes images which may be awarded as a result of playing the game apparatus. The targets may also include images of penalty areas which cause a penalty in the game if the head is detected at the penalty image. The targets also may include an image of a dart board target, where the selection head has an appearance similar to a dart. At least one of the targets may have an associated point score that is added to a game score when the head is sensed at the target.

A method of the present invention similarly provides a game for a player to select targets with a mechanical device and win an award. The method includes displaying a target field including target images using a display screen and allowing a player to influence movement of a selection head in an x-y plane provided above the target field using a mechanical device. The selection head moves toward the displayed target field along a z-axis using the mechanical device. A location is determined in the displayed target field designated by the selection head when the selection head is moved to a predetermined point on the z-axis, such as just above or contacting the screen. A game outcome is determined based on the location in the target field designated by the selection head.

Preferably, one of the target images that is displayed directly below the selection head is selected when the selection head is moved to the predetermined point on the z-axis. A target can be associated with several game effects, such that when the target is selected, the game effect is applied. For example, the selected target can be associated with a prize that is awarded or dispensed to the player, tickets or a printed voucher can be dispensed and used by the player to redeem a prize or merchandise associated with the selected target, a point score can be added to a game score, or a penalty can be applied to the game. In some embodiments, the targets can also be moved in the target field by the display screen controller, or the player can be allowed to control the movement of the selection head after a target has been selected.

The video crane game of the present invention provides a dynamic and interesting alternative to traditional mechanical crane pick-up games. The displayed images of the display device allow more flexible game play and allow the operator to vary and maintain prize selections far more easily than the prior art and provide more interesting game options for the player. The mechanical crane-like selection device offers players a unique, yet familiar, way to use skill in selecting targets that is not used in traditional video games.

These and other advantages of the present invention will become apparent to those skilled in the art after reading the following descriptions and studying the various figures of the drawings.

DETAILED DESCRIPTION OF THE PREFERRED EMBODIMENTS

Figure 1:
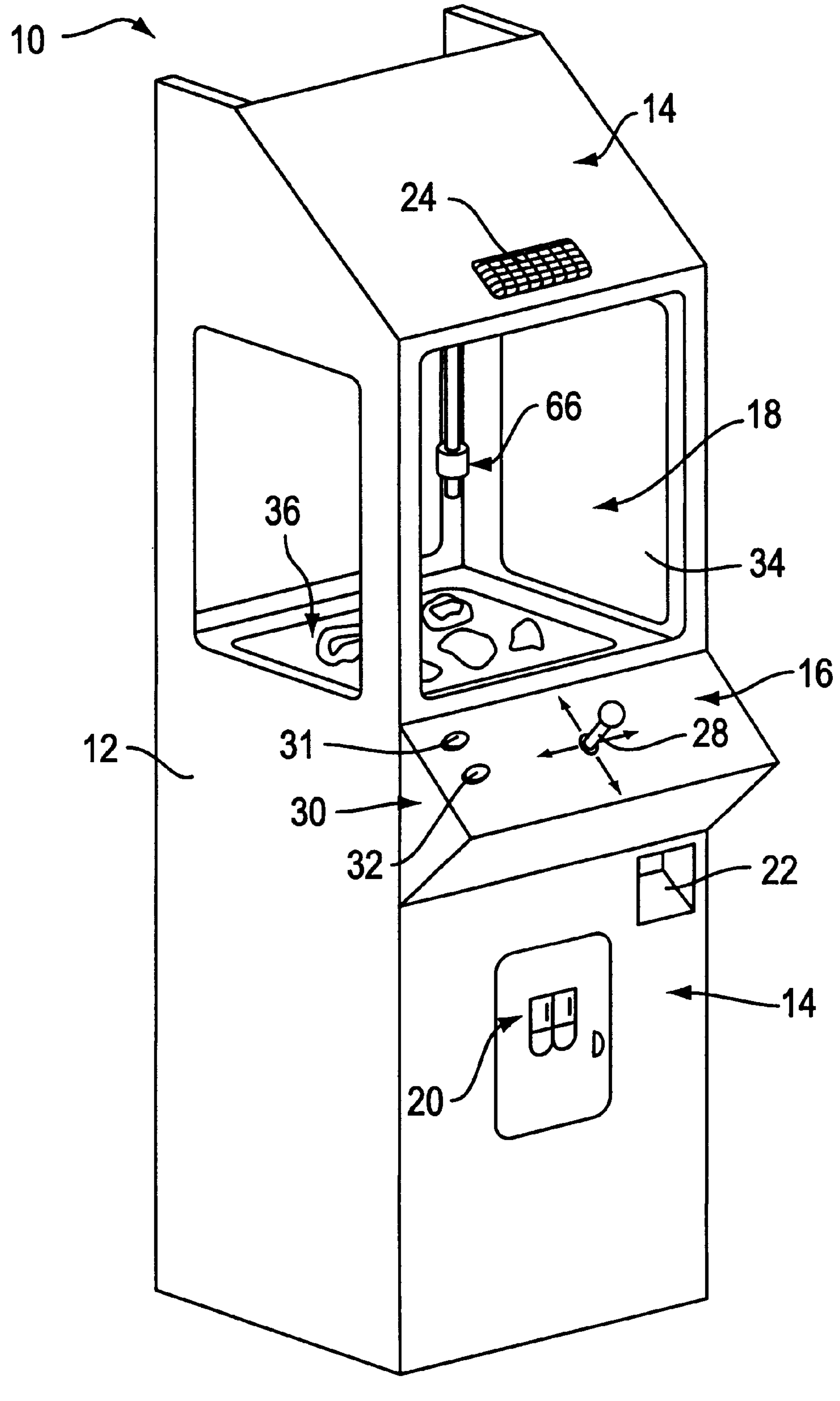
FIG. 1 is a perspective view of a video crane game apparatus of the present invention.

FIG. 1 is a perspective view of one embodiment of a game apparatus 10 in accordance with the present invention. Game apparatus 10 includes a housing 12, front panel 14, player controls 16, and a playing area 18.

Housing 12 provides a support for the other components of the game apparatus. Housings can take a wide variety of forms; for example, as shown in FIG. 1, housing 12 may be of the stand-up arcade game variety in which a player stands in front of the game or sits on a stool when playing the game. In other embodiments, other types of housings may be provided. For example, a counter-top housing, including approximately the upper half of housing 12 shown in FIG. 1, can be used when the game apparatus is desired to be placed on a table, counter top or other similar surface.

Front panel 14 can be positioned below and/or above the player controls 30 and playing field 18, as shown in FIG. 1. The front panel can also be positioned in a wide variety of other locations on housing 12. Front panel 14 includes a coin deposit slot 20, dispenser 22, and speaker 24.

Coin deposit slot 20 typically accepts standard currency coins, game tokens, or bills that are often available in an arcade environment. In some embodiments, other types of monetary input may also be provided, such as a credit card, debit card, etc. A coin deposited in coin deposit slot 20 starts a game. Dispenser 22 is used to provide prizes, tickets, vouchers, or other form of award to the player which have been won by the player from playing the game. For example, if tickets are dispensed, dispenser 22 can dispense a number of tickets to the player based upon a game score or other result or event of a game. The player can then redeem the tickets for a prize at a booth offered in the arcade, for example. Ticket dispensers are well known to those skilled in the art. Alternatively, a printed voucher of value can be dispensed from a printing dispenser 22 and used to redeem a prize, a service, etc. In other embodiments, a prize can be directly dispensed to the player from dispenser 22, such as baseball cards or other trading cards, eggshell containers including a prize, or other objects.

Speaker(s) 24 emits sounds based on game actions and other game states and is controlled by a game control system as described subsequently. The front panel 14 can also include other features if appropriate.

Player controls 16 allow a player to manipulate events in the game, and typically include a joystick, buttons, switch, knob, or the like. Game action occurs in playing area 18, where a mechanical selection mechanism or "crane mechanism" may be controlled and guided by the player to select or "hit" specific areas displayed by a video screen, as described below. In the described embodiment, a joystick 28 or similar device (knob, two buttons, etc.) can be manipulated by the player to move the selection mechanism in a plane defined by two axes (or additional directions, in alternate embodiments). Buttons can also be provided to select various game functions, such as additional directional control of the selection device, number of players in a game, a start button to begin the game, etc. For example, in some embodiments, a slow button 31 can be pressed by the player to slow down (or stop) the movement of the selection device so as to allow the player to more accurately position the selection device. In alternate embodiments, the player may be able to control the speed of motion of other components of the game, such as horizontal or downward movement of the selection device. In other embodiments, a player may select displayed features of the game, as described below.

In alternate embodiments, multiple players can simultaneously or alternately play game apparatus 10. For example, a second set of player controls 16 and dispenser 22 can be provided on the opposite side of the game apparatus 10, and a window can be provided on that side to allow the player to view the playing area 18. The players might alternately control the selection device in playing area 18; or, two selection devices can be provided, with each set of player controls 16 controlling one of the devices. The implementation of a mechanical crane-type game for multiple players is disclosed in greater detail in U.S. Pat. No. 4,778,176, incorporated by reference herein.

Game playing area 18 is used to display the playing field to a player and is the area where game action occurs. A transparent shield 34 can prevent the player from interfering with game action. The playing area 18 houses a video screen 36 and a selection or "crane" device 38. The player guides a head of the selection device 38 and lowers the head so that a game goal can be achieved; for example, a prize or other displayed target may be selected. Once the game is over, the game controller automatically guides the head to a starting position. This game operation is described in greater detail below.

The player controls 16, selection device 38, video screen 36, and other functions of the game apparatus 10 are preferably controlled by a control system. This system is described in detail with respect to FIG. 7.

Figure 2:
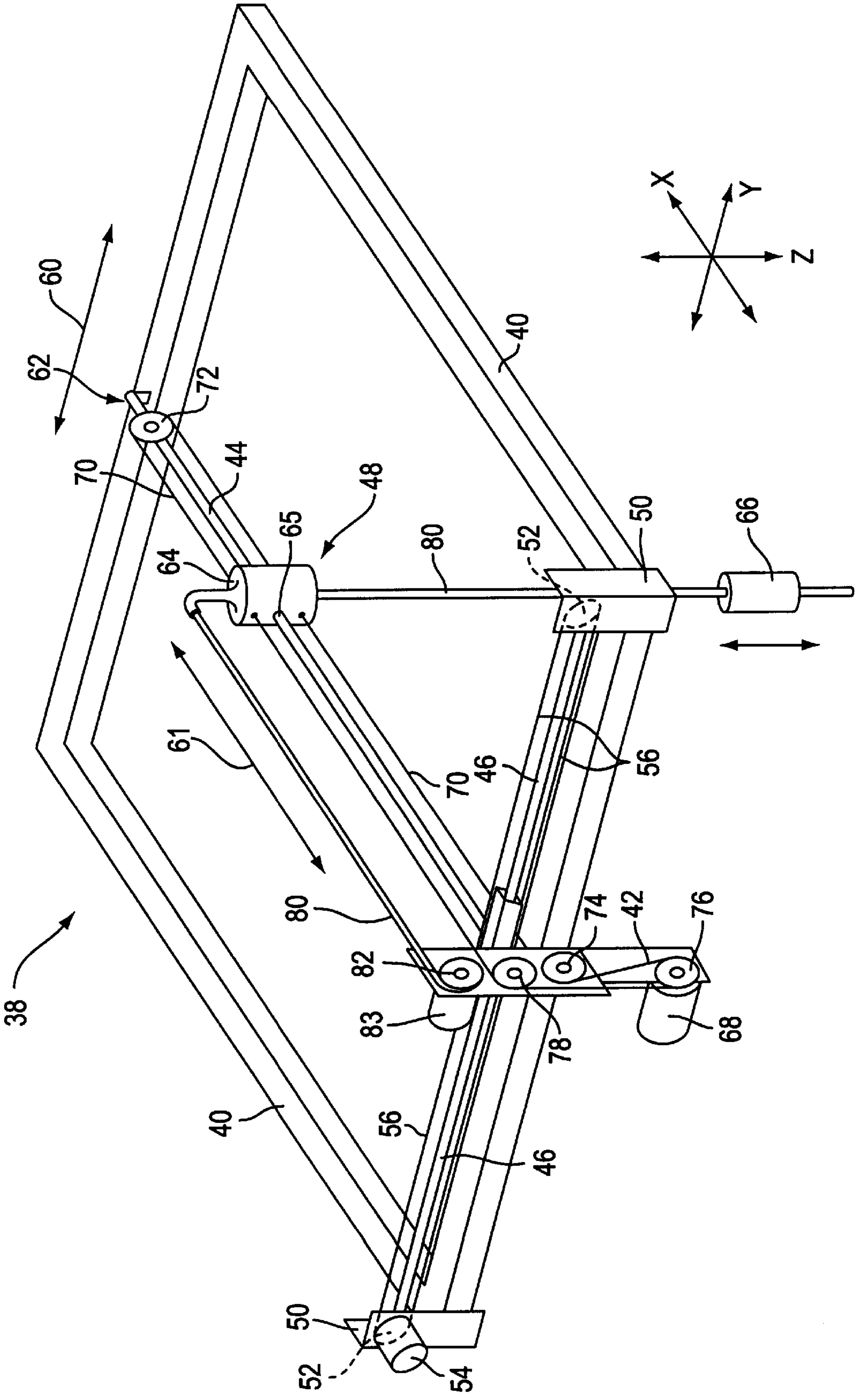
FIG. 2 is a perspective view of a mechanical selection device of the game apparatus of FIG. 1.

FIG. 2 is a perspective view of one embodiment of a mechanical selection device 38 provided in playing area 18 of the game apparatus 10 of the present invention. Selection device 38 is preferably provided above a video screen 36 as shown in FIG. 1. In the described embodiment, a head of the selection device 38 may be moved in two degrees of freedom above the video screen and moved in a z-direction toward and away from the video screen, as described below.

Selection device 38 includes a support frame 40, vertical support 42, x-axis guide rod 44, y-axis guide rod 46, and assembly 48. Support frame 40 may include members coupled to each other in a rectangular configuration for stability, as shown. Frame 40 can be securely coupled to the housing 12 of the game apparatus 10. In the described embodiment, y-axis guide rod 46 is coupled between two support plates 50 mounted on frame 40 and extends parallel to one of the members of the support frame 40. A pulley 52 is rotatably coupled to Y-axis guide rod 46 and to support plates 50 at each end. A motor 54 (y-motor) has a rotatable shaft that is rigidly coupled to one of the pulleys 52 and thus drives that pulley.

Vertical support 42 is a floating support that moves along a y-axis along y-axis guide rod 46. A line 56 is coupled to vertical support 42 and is routed around one pulley 50, back through an aperture in vertical support 42, around the other pulley 50, and is coupled to vertical support 42 at the other end of the line. Thus, motor 54 rotates a pulley 50, which causes line 56 to move, causing vertical support 42 to move along y-axis guide rod 46 in a desired y-direction as shown by arrow 60.

X-axis guide rod 44 is coupled to vertical support 42 and moves along the y-axis in conjunction with vertical support 42, as shown by arrow 60. End 62 of guide rod 44 is supported by frame 40 by a sliding member, wheel, or other component that allows the end 62 to move with respect to frame 40. Assembly 48 moves along the length of guide rod 44 in an x-direction of the x-axis as shown by arrow 61.

Assembly 48 includes a carriage 64 and a sensor head 66. Carriage 64 includes a bore 65 through which guide rod 44 extends. A motor-driven pulley system for moving the carriage includes a line 70 which causes the assembly 48 to move along rod 44 parallel to the x-axis when the line 70 is moved by the pulley system. Line 70 is coupled to carriage 64 and is routed parallel to guide rod 44, around an end pulley 72 coupled to guide rod 44, back along the length of guide rod 44, through an aperture in carriage 64, around pulley 74 that is coupled to vertical support 42, around motor pulley 76 coupled to a shaft of motor 68, and back around pulley 78 coupled to vertical support 42, and is coupled to carriage 64 at the other end of line 70. Line 70 is moved by a motor 68, which is coupled to vertical support 42 and drives a pulley 76 rotatably coupled to support 42. Motor 68 thus rotates pulley 76, which causes line 70 to move carriage 64 along guide rod 44. The player may control the motors and move the head along x- and y-axes using a joystick or other control, as described above.

Assembly 48 also includes a sensor head 66 suspended by a line 80 from carriage 64. Line 80 is preferably a flexible cable, wire, string, or similar cord, or, in alternate embodiments, can be a rigid member or pole (e.g., a collapsible or telescoping rod). Line 80 is routed through the carriage 64 to a roller or spool 82 which is driven by a motor 83 to wind the line onto the roller 82, causing head 66 to be raised vertically toward carriage 64 and away from video screen 36. Similarly, the motor may unwind the line 80 from the roller, causing head 66 to lower vertically away from carriage 64 and towards video screen 36. The head 66 functions to select target areas displayed on the video screen as described in greater detail below.

A similar x-y movement mechanism to selection device 38 is described in U.S. Pat. No. 4,718,667, which is incorporated by reference herein.

In the described embodiment, the video screen is preferably fixed in place, since the head 66 can be moved to any point above the video screen using the selection device 38. In other embodiments, images on the video screen can be moved (or the video screen itself can be moved) to provide additional difficulty to players when playing the game or to allow a simpler selection mechanism having less degrees of freedom to be implemented. For example, images of targets on video screen 36 can be rotated about a central axis through the middle of the screen, as if the targets were positioned on a turntable. In such an embodiment, head 66 need only be moved along a single axis in a single degree of freedom (such as the x-axis), since the rotational movement of displayed images combined with the linear movement of assembly 48 allows the head 66 to be positioned above any point of any target image on the video screen 36. When such moving images are displayed, the head assembly 48 need only be moved in one horizontal axis, e.g., only x-axis movement on guide rod 44 need be provided instead of both x-axis and y-axis movement, thus simplifying the mechanism. In some embodiments, the player may slow, stop, or otherwise influence the rotation or other movement of the target images using a player button or other control 16 during a game.

Figure 3:
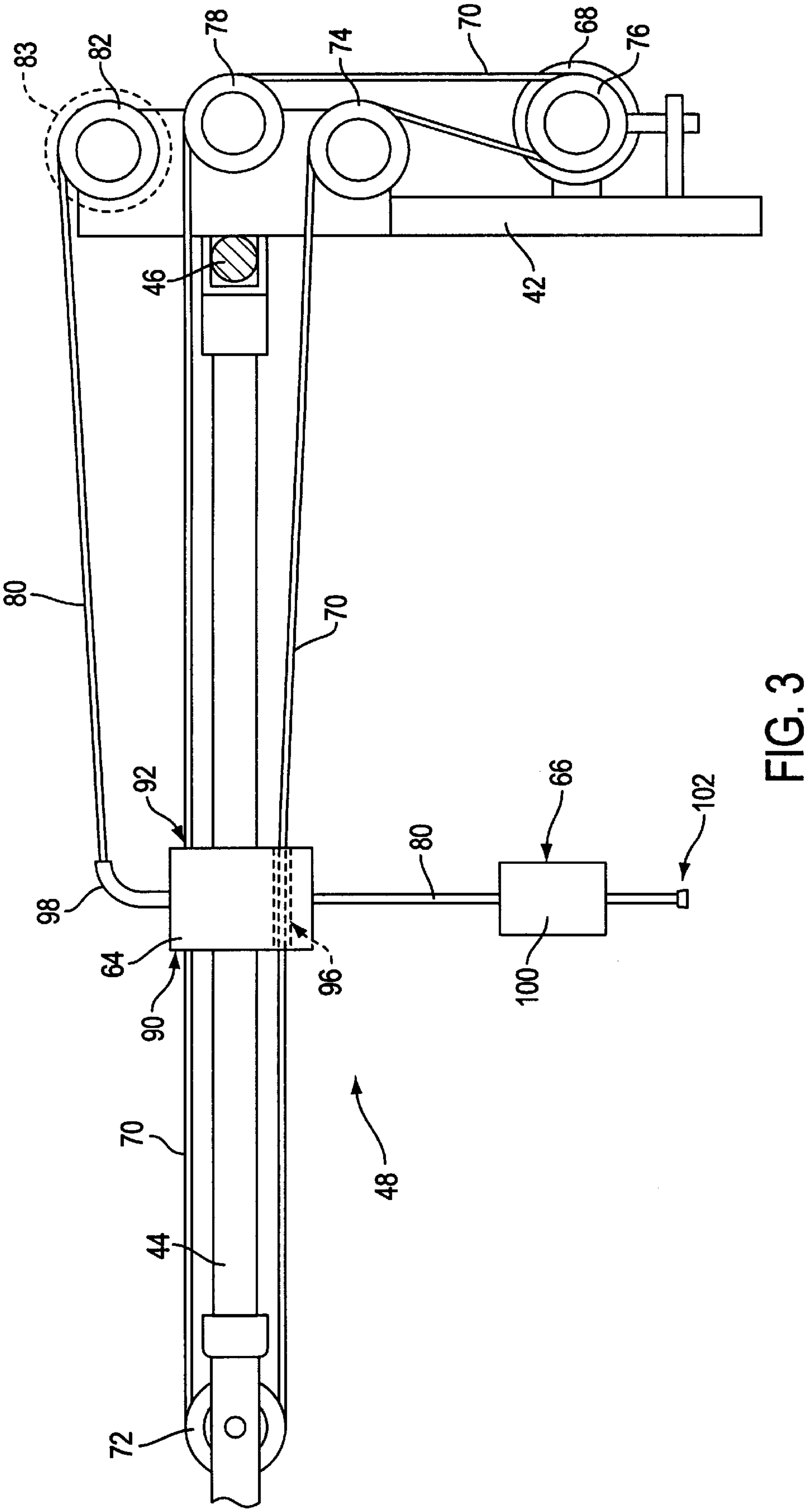
FIG. 3 is a side elevational view of the video crane device of the present invention.

FIG. 3 is a side elevation view of selection device 38, including horizontal guide rod 44 and assembly 48. Guide rod 44 extends over the video screen and is supported by horizontal y-axis guide rod 46 as shown in FIG. 2. Assembly 48 moves along guide rod 44 using carriage 64, which is translated using line 70. One end 90 of line 70 is coupled to one side of carriage 64, and line 70 extends over the top side of guide rod 44 and around pulley 72. Pulley 72 is rotatably coupled to the end of guide rod 44. Line 70 is routed back below the bottom side of guide rod 44, and through a bore 96 in carriage 64. Line 70 continues to vertical support 42, where it is routed around pulley 74 to pulley 76. Line 74 is then routed back up vertical support 42, around pulley 78 which is rotatably coupled to vertical support 42, above guide rod 44, and is coupled at its end 92 to carriage 64. Thus, when line 70 is moved by the motor 68, the carriage 64 is moved along guide rod 44, moving the head 66 along an x-axis to different positions over video screen 36.

Head 66 is suspended from carriage 64 by line 80 and may be lowered or raised along a z-axis. Line 80 is coupled to head 66, is routed through carriage 64, and is routed through guide 98. Line 80 then extends to vertical support 42, where it is wrapped around roller 82. Roller 82 winds up line 80 as controlled by motor 83 to lower or elevate the head 66. When the head 66 is lowered to the lowest elevation (just above or contacting video screen 36), the controller of the game apparatus detects the presence of the head 66 and causes the motor stops unwinding line 80, as described below.

In addition, the head 66 may be desired to be kept at a constant elevation when carriage 64 is moved along guide rod 44. To achieve this, the z-axis line 80 should be wound and unwound from roller 82 in conjunction with any horizontal movement along the x-axis. This procedure also prevents any sway in head 66 during x-axis travel. For example, when head 66 is moved toward pulley 72, line 90 should be unwound at a corresponding rate to the travel of carriage 64 to maintain head 66 at a constant elevation. Similarly, line 80 should be wound when carriage 64 is moved toward pulley 78. When head 66 is at a fully raised position, the line 80 is preferably not actively unwound from the roller 82; rather, the line 80 is simply dragged and unwound by the motion of the carriage 64 (this is preferably implemented by making the clutch for motor 68 stronger than the clutch for motor 83).

Head 66, in one embodiment, includes a weighted portion 100 and an extended portion 102. Weighted portion 100 is included to provide a weight at the end of line 80 and thus allow the player to position the head 66 with greater accuracy and without influence from air currents or other influences that may affect a lightweight line 80. For example, in preferred embodiments, weighted portion 100 can be made of metal, plastic, or other material with like characteristics. In other embodiments, the extended portion 102 itself provides enough weight so that weighted portion 100 can be omitted from head 66. The head 66 preferably is provided with a facade or shape that is appropriate to particular embodiments of games and/or is attractive to players. For example, the head 66 may be in the shape of a dart (as in the embodiment of FIG. 5 below), a fly or other creature, a bomb or missile, a sword or knife, an arrow, screwdriver, drill, pencil, etc.

Extended portion 102 is provided on or in head 66 to be detected by the controller of the game apparatus to determine the position of the head 66 in relation to the video screen 36 and/or images displayed on the video screen. In some embodiments, the extended portion 102 may be included inside the weighted portion 100. Portion 102 can be shaped in any way approrpiate for a particular game. In one embodiment, extended portion 102 includes a sensor for detecting light or other electromagnetic radiation from the video screen within a small area. For example, optical sensors suitable for such use are well known to those skilled in the art. Thus, the sensor preferably will detect the light when the bottom end of the extended portion is within a predetermined range of the emitted light radiation of one or more pixels displayed by the video screen. Since a typical raster video screen quickly scans a raster beam across the display to illuminate pixels, the sensor can detect a pixel's radiation over multiple scans of the beam. The sensor can be tuned, or the game controller can programmed to pay attention to detected intensities above a predetermined threshold, such that the sensor only detects a pixel(s) of the video screen when the extended portion is very close or touching the surface of the video screen. Once the radiation from the video screen is detected, the controller of the game system determines a game outcome or result, as described below. The sensor can be designed to detect one pixel or a number of pixels, depending on the selection accuracy and reliability of detection desired.

In another embodiment including a touch screen as video screen 36, extended portion 102 need not include a sensor, but is used as an actuator to contact conductive lines on a touch screen. For example, a voltage or resistance can be provided on the tip of the extended portion 102 so that contact with the touch screen can be detected. This is described in greater detail with reference to FIG. 6.

The end or tip of extended portion 102 can be of different sizes. For example, if a sensor or detection method having a high amount of precision is used, the tip can be made narrow. If a touchscreen (or other sensing device) having a low resolution is used, then a large or wide tip can be provided on extended portion 102. Other embodiments can include different devices for determining the location on the video screen which extended portion 102 is directly above or contacts.

Figure 4:
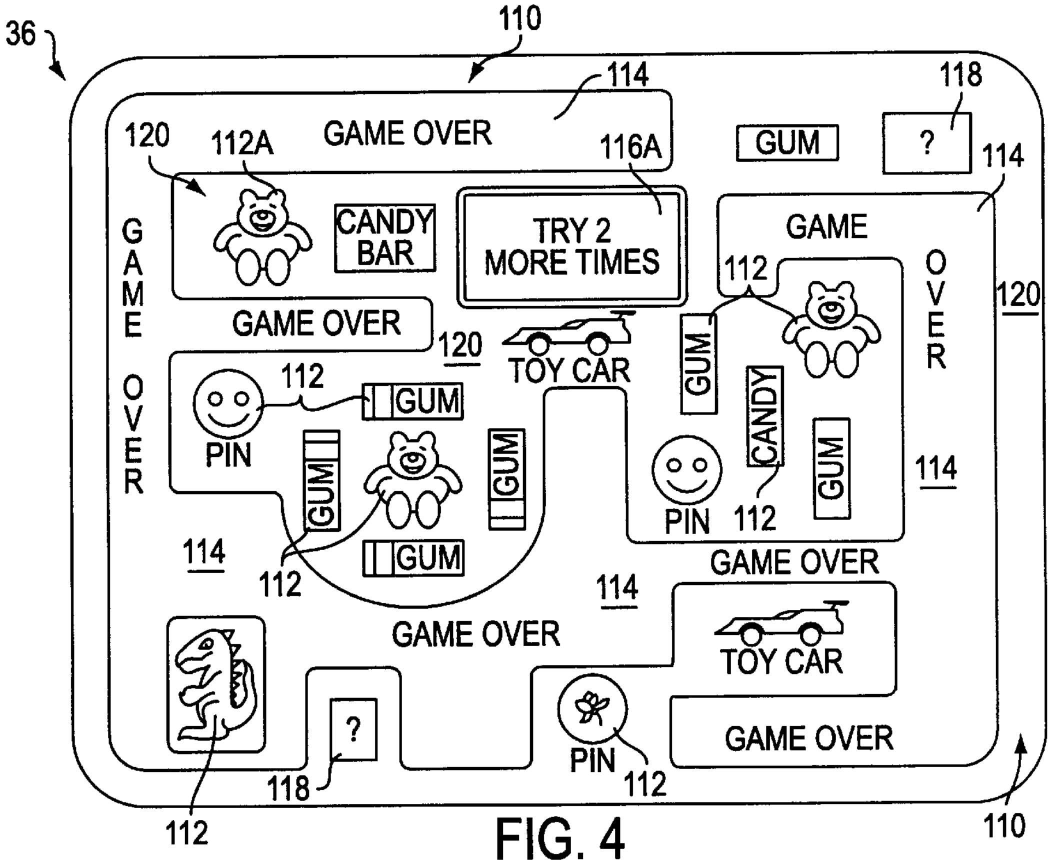
FIG. 4 is an illustration of a target area displayed by the video screen of the present invention.

FIG. 4 illustrates an example of a target area 110 displayed on video screen 36 during a game. In the example of FIG. 4, target area 110 includes several prize images 112, penalty images 114, bonus images 116, and undetermined prize images 118. These images are displayed by a controller and display monitor, such as a CRT, raster device, liquid crystal display, or other type of display device as well known to those skilled in the art.

Prize images 112 are displayed in target area 110 and are used to define areas on display screen to which a player can guide head 66 of the selection device 38 to win a prize. For example, a player may move the head 66 over a target image of target area 110, and the head 66 is lowered toward the screen. If extended portion 102 of the head 66 is sensed at prize image 112*a*, then the player is determined to have won a prize or award associated with the prize image 112*a*. For example, since prize image 112*a* depicts a bear, the player can be awarded a stuffed bear if the head 66 "selects" or "hits" the bear image 112*a*, i.e. if the head 66 is sensed at the bear image. This prize can be dispensed from the game machine or separately awarded to the player using tickets or a voucher, as described below. Other prize images 112 include images for pins, candy, gum, model cars, and other stuffed animals. A variety of other types of prizes can be displayed in other embodiments, including jewelry, toy models, rubber toys, trading cards, music media (CD's, cassettes, etc.), software programs, electronic handheld games, toy guns, noisemakers, marbles, pogs, gift certificates, or other types of prizes. In other embodiments, the displayed prize images 112 can each be associated with a displayed point value. If a particular prize is selected, its point value is added to the player's score, and tickets can be dispensed based on the total game score.

Penalty images 114 in target area 110 are used to define areas on the display screen which cause a penalty to the player in the game if the head 66 is guided to a position to select one of these images. In FIG. 4, images 114 are "game over" images, i.e., these images, if selected by the head 66, will cause the player's game to immediately be over. Thus, to continue to play the game, the player would have to insert another coin or other monetary input and play another game from the beginning. In other embodiments, penalty images 114 can cause other types of game penalties. For example, if a game score is provided (as in FIG. 5), then a predetermined amount of points can be subtracted from the game score or the game score can be reset to zero (e.g. "bankrupt") if the head selects an image 114.

Bonus images 116 can be displayed in target area 110 and are used to define areas on display screen 36 which provide a bonus or extra feature to the player's game if the head 66 is guided to a position to select an image 116. For example, in FIG. 4, area 116*a* can cause the player to get two chances to select a prize if area 116*a* is selected by the head 66. If the player misses a prize with the first try, he or she can try again. Alternatively, a player might be able to win two prizes with two tries. Other types of bonus areas can be provided in other embodiments, such as areas that add a bonus score to the players score, automatically award a player the most valuable prize, or allow the player to move the head 66 "sideways" in a plane parallel to the x-y plane to select a prize he or she desires.

Undetermined prize images 118 can be displayed in target area 110 to provide random or surprise awards to a player. For example, when an image 118 is selected by head 66, a randomly-determined prize from a predetermined list of prizes can be awarded. An image of this randomly determined prize can be displayed on video screen 36 once it is determined. Alternatively, the prize awarded might be determined according to a predetermined pattern or method, but may be unknown to the player until the image 118 is selected in a game.

In some embodiments, the blank or background area or areas 120 of the target area 110 or video screen can be "selected" to provide a particular game result. For example, in the described embodiment, the player will get another chance to select a prize if a background area 120 is selected. The head 66 can be raised and the player can be allowed to position it as if starting the game over. In other embodiments, selecting a background area 120 might cause the game to be over, or the nearest target's award (or penalty) to the selected point might be awarded to the player.

The images 112, 114, 116, and 118 are preferably arranged in target area 110 to attract a player to the game as well as to make the more valuable prizes more difficult to win than the less valuable prizes. For example, prize images 112 are preferably arranged within or nearby penalty images 114 so that if a player has mis-aimed the head 66 when attempting to select a prize, the player will get a penalty instead of the prize. This feature rewards players who have learned to control the head 66 with skill by playing the game multiple times. In addition, the more valuable prizes 112 and 116 are preferably displayed as smaller images that are more difficult to select, or are completely surrounded by penalty images 114. Thus, the player must risk not getting the prize when attempting to win the more valuable prizes. Furthermore, a more valuable prize (such as a stuffed bear) can be surrounded with many less valuable prizes (such as candy or gum), so that a player may generally aim for an area of display screen 36 and have a reasonable chance of getting a prize, even if it is more probable to receive a prize of lesser value.

In the embodiments detailed herein, the normal operation of the game allows a player to guide the assembly 84 to a location above a desired area displayed on video screen 36, after which the head 66 is lowered and any target selected by the head 66 is applied to the game. After this selection, the game is over and the head 66 and assembly is moved back to the starting position. However, in other embodiments, the player may be required to continue guiding the head 66 during the game. One such embodiment is described with reference to FIG. 5, where a player gets multiple attempts. In another embodiment, the player might be required to select a sequence of targets. For example, a game might randomly determine which targets the player must attempt to hit with the head 66. First, the stuffed bear prize image 112*a* is randomly determined to be the first target, and is highlighted by the game controller by displaying the image 112*a* in a different color or brightness or marking the image in some other way. The player might be given a limited time period in which to select or hit the hightlighted target with head 66. If and when the player guides head 66 to hit the first target 112*a*, then a different target image 112*b* is similarly highlighted. Only after the player has selected all the targets, e.g. three successive highlighted targets, will the player win the associated prize or be awarded bonus points or some other award. Other variations of this process can also be implemented in which a player must continue to position head 66 in relation to changing or moving targets displayed on video screen 36. For example, a player might be required to spell a word by targeting several letters moving around the target area 110. Each selected letter can be worth a certain number of points or a prize, and the completion of selecting the spelled word might award the player a bonus prize or award.

In yet other embodiments, the player can preferably select a control 16 such as a button to select one of multiple available target areas or fields (or, the player may select a target in the target field with head 66 to change/select a displayed target area). The entire displayed area of screen 36 can be changed, or just a portion of the displayed images on the screen. For example, at the beginning of the game, the player is offered to play the game using target area 110, or may press a button to select a different target area to be used in the game, such as target area 130 of FIG. 5. Additional target areas/screens might also be provided with different themes. For example, one target area might be a football field or other sports arena with sports-related prizes, while a different target area might have a space theme with space-related toy prizes. Or, one target area might offer all stuffed bears, while a different target area might offer all model airplanes. The player would be given the option to select a desired target area before a game, or during a game, where the selection depends on the player's interests. In other embodiments, the target area or field may change automatically during the course of game play (without player selection) to provide the player with a different set of goals, targets, and/or difficulty.

Thus, one advantage of the present invention over prior art crane mechanical games is that the operator has a great deal of flexibility in providing the prizes that will be available to players of the game. The operator can display images of virtually any type of prize and is not limited to prize size, shape, or other similar limiting factors as in the prior art claw pick-up games. In addition, the game can be made much more interesting to players, since the images can be made to move, other goals can be flexibly provided (such as the sequence of targets which the player must select), and the players may be given a choice from multiple target displays. Thus, a much larger variety of games can be played on a single game apparatus, unlike the more limited prior art crane games.

Figure 5:
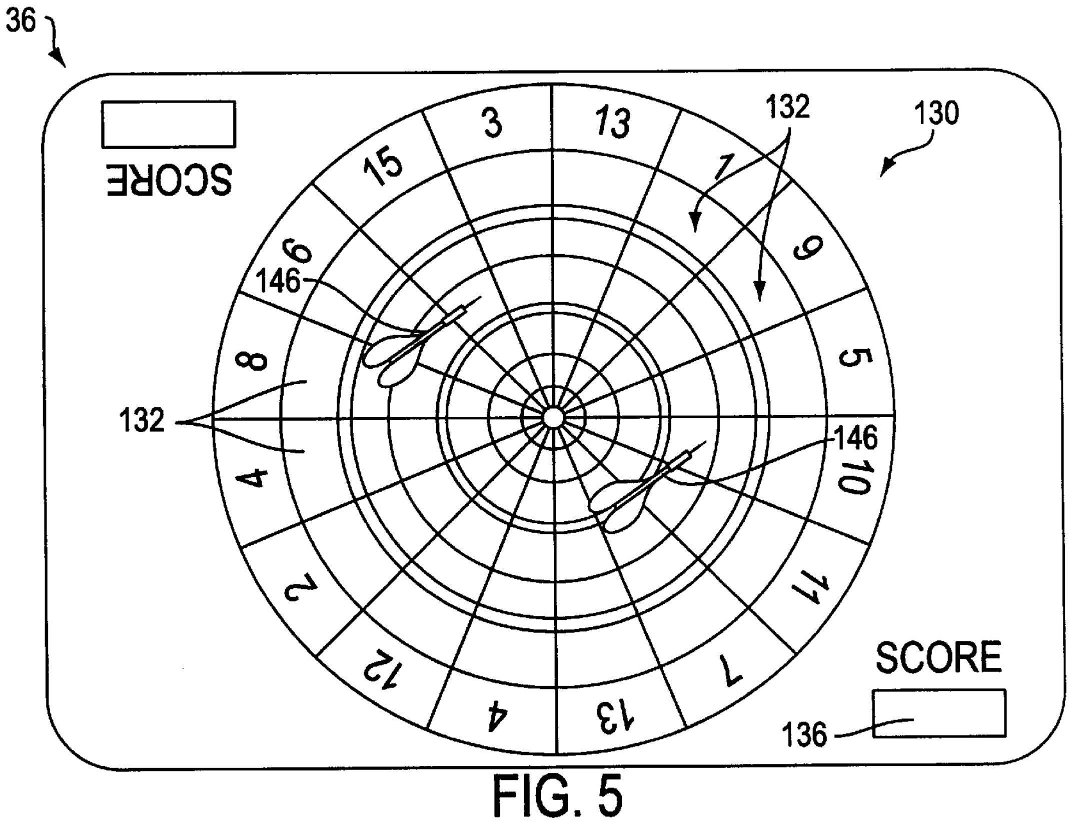
FIG. 5 is an illustration of a second example of a target area displayed by the video screen of the present invention.

FIG. 5 illustrates a second example of a target area 130 displayed on video screen 36 during a game. In the example of FIG. 5, target area 130 is a circular target that resembles a standard dart board in the game of darts. Thus, a player would guide head 66 toward the target area 130 as if the head 66 were a thrown dart. In some embodiments, the head 66 can be made to look like a dart, e.g., tail fins, a thin point, and a central body in the configuration of a standard dart can be coupled to the end of line 80, where a sensor (if implemented) is provided in the tip of the dart.

Target area 130 includes a number of segments 132. If head 66 is detected at any point within a segment 132, then the number 134 associated with that segment is added to the player's score. The player's score is preferably displayed in field 136. In embodiments where two or more players have separate player controls 16, additional score fields 136 can be displayed in target area 130.

Several bonus areas 138 are also provided in target area 130. For example, when head 66 is sensed within areas 140, a point total double that indicated by number 134 is added to the player's score. If head 66 is sensed within areas 142, a point total triple that indicated by number 134 is added to the player's score. If head 66 is sensed within bullseye area 144, a large point total, such as 50 points, is added to the player's score. Other penalty areas can be added to the target area 130 similar to the embodiment of FIG. 4.

In the preferred embodiment of FIG. 5, the player may aim the head 66 multiple times with a single coin so that the score 136 reflects the points awarded from each of the times the dart (head 66) is guided. The head thus represents a single dart, and the multiple tries is similar to throwing multiple darts and adding the score in a traditional game of darts. In such an embodiment, once a dart has been thrown, a dart image such as image 146 can be displayed while the head 66 is raised and moved back to its starting position. Image 146 can indicate to the player how many darts have already been guided or "thrown" in the current game. In other embodiments, other variations can be provided, such as allowing two players to simultaneously guide a dart head 66 of their own, providing different score totals for different bonus areas 138, subtracting score for other penalty areas (similar to the embodiment of FIG. 4), etc.

Preferably, after a player has guided all provided "darts" in a game, the total score is determined and a number of redemption tickets or a voucher is dispensed based on the point score. Alternatively, a prize may be directly dispensed from the game apparatus based on the game score. In yet other embodiments, prize images similar to images 112 of FIG. 4 can be displayed in segments 132 or otherwise associated with areas of target area 130, such that if the player guides head 66 to an area, the pictured prize for that area is dispensed or otherwise awarded.

Figure 6:
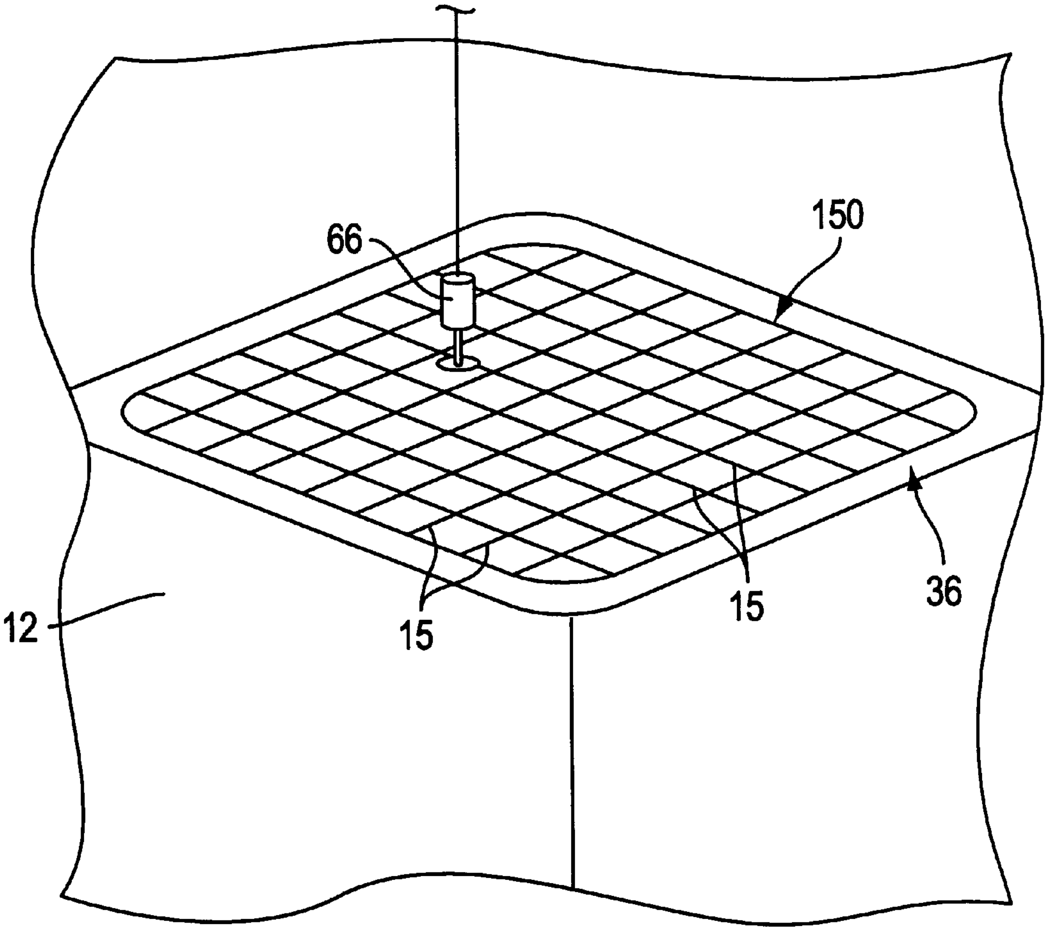
FIG. 6 is a perspective view of a touch screen embodiment of the present invention.

FIG. 6 is a perspective view of an alternate touch screen embodiment of video screen 36. In this embodiment, video screen 36 can be implemented as a touch screen 150, which may include a grid 152 including a series of x-axis conductive lines 154 and a series of y-axis conductive lines 156 that are invisible or only faintly noticeable to the user. Head 66 can be lowered to contact the touch screen 150 so that the tip of the head 66 contacts an x-line 154 and a y-axis line 156. As is well-known to those skilled in the art, the coordinates of the contact can be sensed by detecting the change in resistance or voltage in the contacted x-axis line and y-axis line. Thus, head 66 can be provided with a resistive element in its tip, or with a voltage from a voltage supply that allows the contact of the tip with the lines 154 and 156 to be sensed. For example, the voltage supply can be provided on the carriage 64 of the selection mechanism, or on a grounded surface or component of the mechanism or housing. The resolution of the contact can be increased by adding more x- and y-axis lines. Other types of touch screens and sensing devices can also be used which sense contact on screen 36 or otherwise detect the location of an object at or near the screen. For example, a series of optical emitters can be placed on one side of the video screen 36, and correpending optical detectors can be placed on the opposing side to create x-axis beams similar to lines 154. When an optical beam (e.g., infrared beam) is blocked by the presence of head 66, the detectors sense this blockage and the game controller knows the location of the head by knowing which beam was blocked. A grid of such beams can be provided similarly to grid 152.

Figure 7:
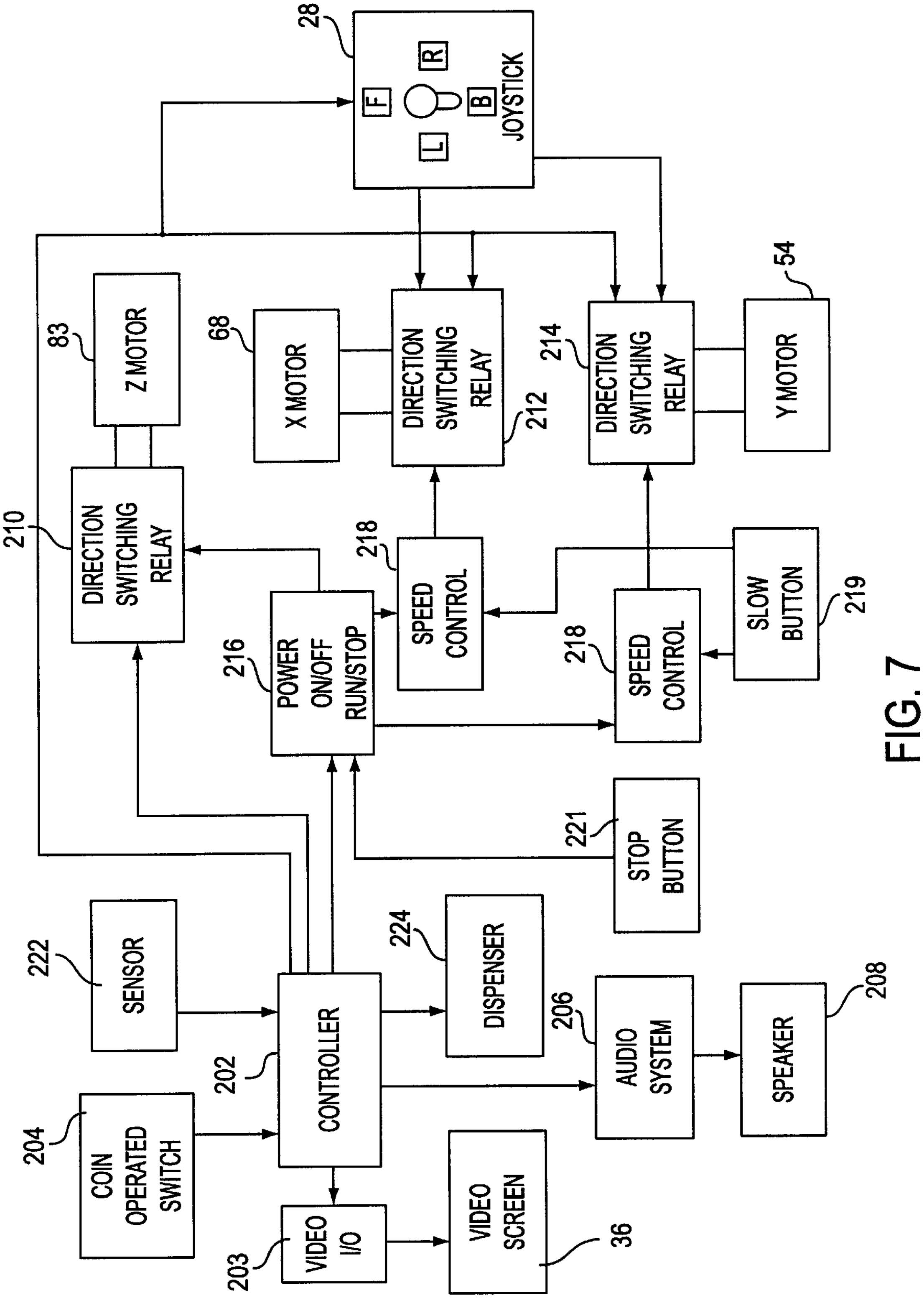
FIG. 7 is a block diagram of a control system for the game apparatus of FIG. 1.

FIG. 7 is a block diagram of a control system 200 suitable to control the operation of game apparatus 10. The control system, for example, can be implemented on one or more printed circuit boards which can be located in the interior of game apparatus 10 and can be connected to such components as motors, solenoids, etc. by electrical wires. Many of the components described in control system 200 are similar to the control system described in U.S. Pat. No. 4,778,176, which is incorporated by reference herein. The components of control system 200 include a controller 202, which controls the operation of the game apparatus 10. For example, a wide variety of microprocessors can be used as controller 202, from 8-bit microprocessors to more complex types as is well known to those skilled in the art. Controller 202 can also be coupled to RAM, ROM and/or other components (not shown) that may include start-up instructions, operating system, scratch-pad memory, and other instructions or storage. For example, a start-up procedure including a self-test and a check that the assembly 48 is in a starting position can be performed as instructed by code stored in ROM. Instructions to perform the game sequence can also be stored in memory. Methods for coupling ROM and RAM to the controller 202 are well-known to those skilled in the art. In addition, controller 202 is preferably coupled to a video I/O block 203, which can be a video card or other component used for displaying images on video screen 36. The controller 202 can also be coupled to other I/O circuitry (not shown) which can include such components as drivers, buffers, latches, etc. to interface the components of the control system with the controller.

The controller 202 sequences through the software instructions stored in memory and sends and receives data over control lines in order to conduct a game. For example, when the coin slot switch 204 is activated, indicating a coin has been inserted into coin slot 20, the controller receives a signal the switch and starts a game. The controller 202 receives input signals from other input devices and switches similarly, and outputs signals to control the motors and other output devices. The controller 202 can also implement a timer used to time various stages of game play, if desired for a particular embodiment.

Video screen 36 is coupled to controller 202 through a video I/O block, the implementation of which is well known to those skilled in the art. Video screen 36 is preferably a standard raster video display screen, monitor, or CRT; however, other suitable display devices can also be used, such as LCD screens or other types of screens.

Coin operated switch 204 detects when a player has inserted a coin into the game apparatus (or other monetary input). Audio system 206 is controlled by controller 202 to generate audio effects before, during and after game play using a loudspeaker 208, as is well known. Other components coupled to and controlled by an output signal of controller 202 include x motor 68, y-motor 54, and z-motor 83. X-motor 68 moves the assembly in an x-direction along guide rod 44, y-motor 54 moves the assembly along guide rod 46, and z-motor 83 raises and elevates the head 66 in a z-direction, as explained above. Z-motor 83 also is coupled to a direction switching relay 210 which is used to reverse the direction of the motor by reversing the polarity of the drive voltage. X-motor 68 and y-motor 54 are similarly coupled to direction switching relays 212 and 214, respectively.

Controller 202 controls the supply of power to motors 83, 68, and 54 using power on/off relay or transistor 216. For z-motor 83, x-motor 68, and y-motor 54, the controller 202 may use two lines, one line to control when the motor runs and the other line to control the direction of the motor. For example, the RUN signal provides base current to the power relay 216, and the DIRECTION signal provides base current to a switching transistor in relay 210 (or relays 212 or 214) to reverse the direction of the motor. The motors 83, 68, and/or 54 may additionally be controlled by the player or controller 202 to stop, start, or be slowed during game play in some embodiments.

A speed control component 218 (potentiometer, etc.) may optionally be coupled to motors 68 and/or 54 (or motor 83 in alternate embodiments) to vary the speed of these motors. This is used in those embodiments where a player is provided with a control to vary the speed movment of head 66 to allow accurate positioning of the head 66 over a desired prize image displayed on video screen 36. For example, such a control can be slow button 219 which allows the player to slow the speed of the x- and y-movement while the button is pressed. Also, a stop button 221 can be implemented which completely stops the movement of the head 66 in the z-direction as the head is lowered toward the video screen. In yet other alternate embodiments, a start button can be provided to start the z-movment of the head 66 after it has been stopped. These player controls (such as a slow button, stop button, and/or start button) and appropriate components allow the speed of the translation of assembly 48 to be varied, stopped, or started by the player, thus allowing the player more options to exercise skill in the accurate positioning of the head 66 over a desired prize image displayed on video screen 36. Player controls can also be included to allow the player to influence the display of images, such as targets, on video screen 36. For example, the player might press a button to highlight a desired target image on the video screen, and could be awarded bonus points if the player managed to then select with the selection device the particular target that the player highlighted using the button.

Joystick 28 can be included to allow the player to control the x-position of the assembly 48. A signal indicative of joystick direction can be input to direction switching relays 212 and 214 to change direction of the x-motor and y-motor, respectively. For example, the player can control x-motor 68 by moving the joystick forward to move the assembly 48 along the x-axis toward one end of the guide rod 44 (e.g., toward the back of the game apparatus 10), and by moving the joystick back to move the assembly to the other end of the guide rod (e.g., toward the front of the game apparatus 10). Likewise, the player can control y-motor 54 by moving the joystick 28 left and right to move the assembly 48 left and right along the y-axis, respectively. In other embodiments, the joystick signal can be input to controller 202, which then commands the direction of the motor as appropriate.

Sensor 222 is used to detect the presence and/or location of the head 66 when it is just above or contacting the video screen 36. In the preferred embodiment, the sensor 222 is an optical sensor provided at the tip of head 66 which sends an appropriate signal to controller 202 when light from pixels or images of the video screen 36 are detected. Since the controller knows which pixels of a raster video screen are being displayed at the time the light is detected, the controller knows the location of the head 66, preferably within accuracy of a single displayed pixel. Typically, the closer the sensor 222 gets to a displayed pixel, the more accurate the sensing of the pixel. A threshold intensity of the displayed light can also be detected, such that the controller will not determine that a pixel has been sensed until the threshold intensity has been detected. The operator of the game preferably is able to set this threshold to adjust difficulty of the game.

Other types of sensors 222 can be used in other embodiments; for example, sensor 222 can be the x-lines 154 and y-lines 156 of the touch screen embodiment of FIG. 6 or other sensing elements of other types of touch screens. Or, a type of contact sensor can be provided on head 66 to determine when contact is made, and the position of the carriage 64 in the x-y plane is known by the controller or can be determined from mechanical sensors on the selection mechanism. Once the position of the carriage 64 is known, the corresponding area selected on the video screen 36 can be determined by the game controller from predetermined data that maps positions of the carriage 64 or head 66 in the x-y plane with positions on the surface of the video screen 36.

Dispenser 224 can be included in the game apparatus 10 to dispense awards such as prizes, vouchers, or tickets to a player during or at the conclusion of a game. For example, if a player selects a particular prize image using head 66, the prize itself, or a voucher or redeemable tickets corresponding to the selected image, can be dispensed from dispenser 224. Alternatively, a number of tickets are dispensed which the player can redeem for prizes at a prize booth. In other embodiments, an operator of the game or the gaming establishment can manually provide a won prize to the player.

Figure 8:
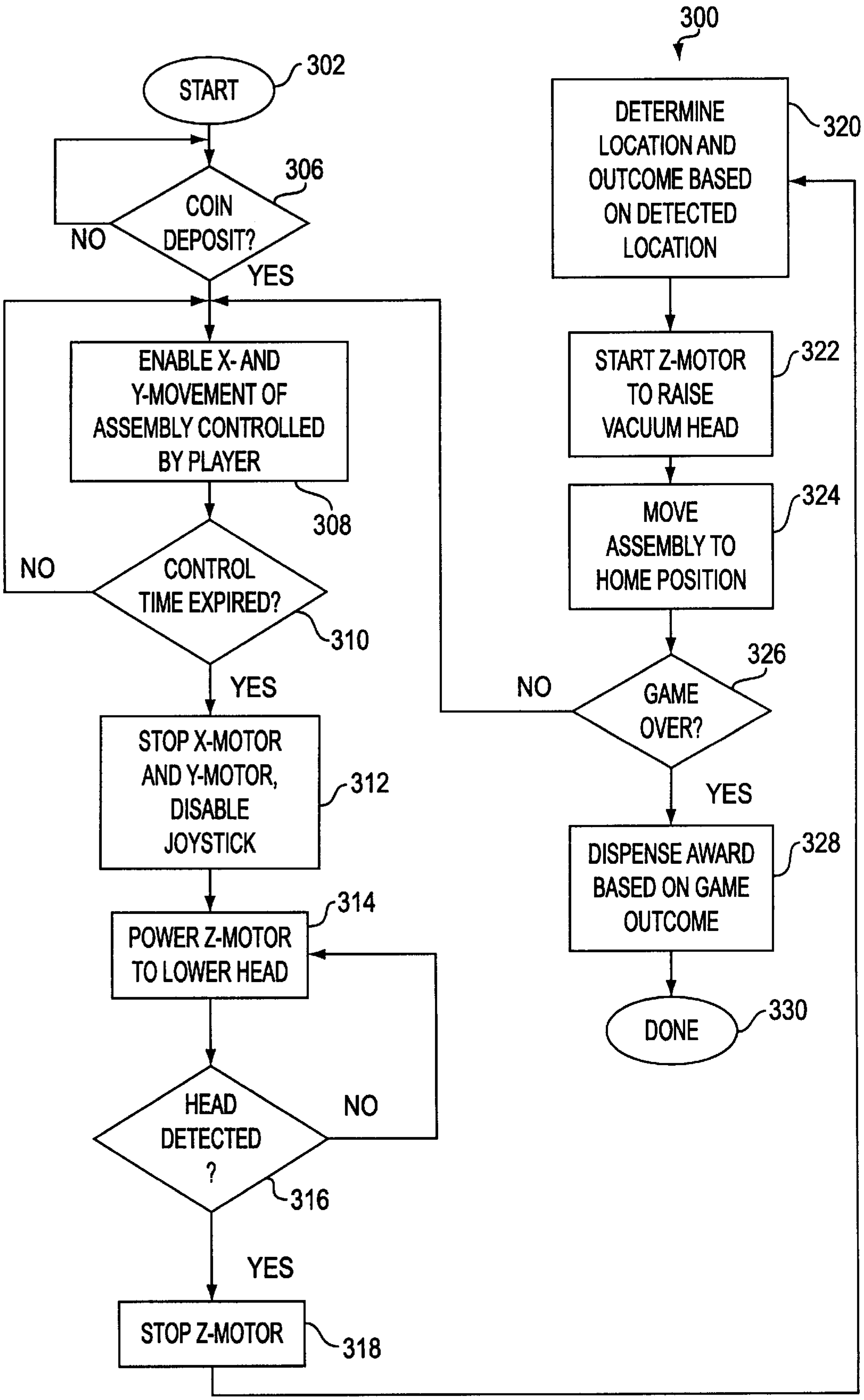
FIG. 8 is a flow diagram illustrating a method of operating the game apparatus of the present invention.

FIG. 8 is a flow diagram illustrating a method 300 of operating the game apparatus 10 of the present invention. The process begins at 302. Optionally, after the game has been powered up, the controller 202 may check that the assembly 48 is in a home starting position. The home position can be any predetermined position in the x-y plane (and/or along the z-axis); for example, the home position can be the position nearest to the right rear corner of the playing area 18 with the head 66 withdrawn to a fully raised position in the z-axis. This step, however, is not necessary if the head 66 is moved to its home position at the conclusion of a game (step 324, below).

In step 306, the controller 202 checks whether a coin or other monetary input has been provided to the game apparatus by the player. If not, the process continually checks for a coin at step 306. Once a coin is inserted, the controller 202 enables x-movement and y-movement of the assembly 48 as controlled by the player in step 308. Thus, the controller supplies power to x-motor 68 using relay 216 and enables joystick 218 to command a direction of the x-motor with relay 212. Similarly, the controller supplies power to y-motor 54 using relay 216 and enables joystick 218 to command a direction of the y-motor with relay 214. The controller 202 can also provide movement of images on the video screen at this stage in the game process and/or during other stages.

In step 310, the controller 202 checks whether the control time has expired or whether a start button (if included) has been activated. The "control time" is the time allowed for the player to position the assembly to a desired x-y position in the x-y plane above video screen 36. For example, a control time of 9 seconds can be used. If the control time has not expired, the process returns to step 308 to allow further x- and y-movement of the assembly by the player in step 308. If the control time has expired, then the controller stops the x-motor and y-motor and disables the joystick in step 312. The controller 202 stops the x-motor and y-motor by removing current to the motors.

In next step 314, the controller 202 powers the z-motor to lower the head 66. The z-motor 83 is supplied with power by the controller 202 similarly to the x-motor and y-motor as explained above. In step 316, the controller 202 checks whether the head 66 has been detected at a "selection point" where the head 66 "selects" one or more pixel(s) on the screen 36. For example, the selection point can be where head 66 is detected near screen 36 using sensor 222 in head 66 that detects the electomagnetic radiation from video screen 36. Or, the selection point can be the point of physical contact of the head 66 with contact sensors on screen 36 or on the head 66 itself. In yet other embodiments, the head 66 can be sensed at different positions on the z-axis that each have different game results or game scores (e.g., there may be multiple selection points on a z-axis). In such an embodiment, different types of z-axis sensors can be used. For example, a z-axis sensor can be provided on the sides of the housing; a sensor could be provided on selection device, such as a sensor that detects marks on line 80; or the controller can determine the z-axis position by knowing the speed of movement of the head 66 on the z-axis and the amount of time that the head 66 is lowered from its fully raised position.

If the head 66 has not been detected, the process returns to step 314 and continues to lower the head 66. If the head 66 has been detected, then in step 318, the controller 202 stops the z-movement of the head 66 toward the video screen by removing power to the z-motor 83 (or activating an off switch, etc.). In some embodiments where different positions of the head 66 on the z-axis may be detected, the head 66 can be allowed to continue movement if desired until the video screen 36 is at or near contact with the head 66.

During some or all of steps 308–314, the player may, in some embodiments, be allowed to stop or slow the movement of head 66 and or control or influence the motion of images on display screen 36 by activating appropriate buttons or other controls, as explained above.

In step 320, the controller 202 determines a location of the head 66 at video screen 36 and determines an outcome based on the detected location of the head 66. In one embodiment, the controller 202 uses the moment when the head 66 was detected and the pixel or image portion that was displayed at that moment of detection to determine the precise location of the head 66 with respect to the x-y plane of the images displayed by the video screen.

For example, the controller 202 outputs images to video screen 36 by sending data to video control card 203 or an equivalent component. In a raster display device, the images on the video screen are composed of units called pixels, which are fundamental picture elements of a visual representation or image generated by the display device. A "raster" output device creates an image by displaying an array of pixels arranged in rows and columns from a bitmap or other digital data that has been converted to analog form. In display devices such as CRT's, the pixels are displayed by scanning an electron beam across the screen in horizontal scan lines, where the electron beam moves to the next horizontal scan line after reaching the end of the current scan line. Counters can be used to keep track of the current scan line and the current pixel being displayed on the current scan line.

The controller 202 can determine which pixel is currently being displayed when the head 66 is initally detected by checking such counters. The current pixel as counted by the counters is the location of the head 66 with reference to the displayed image. The precise location of the head 66 can thus be directly obtained, since the count of the counter(s) corresponds to the horizontal and vertical position of the pixel on the pixel array. In alternate embodiments, the controller determines the location of head 66 at video screen 36 in other ways. For example, when using the touch screen of FIG. 5, the contact of the head 66 on the video screen 36 is sensed directly as explained above.

Once the location of the head 66 is determined with reference to the displayed images or screen 36, the controller 202 determines an outcome of the game based on the detected location. For example, if the extended portion 102 of the head 66 is detected at a prize image 112, then the outcome of the game is that the player has won the prize associated with the selected image. If the head 66 is detected at a bonus or penalty prize area, then the bonus or penalty is determined. In the embodiment of FIG. 5 and ther embodiments involving a game score, the score of the player is adjusted according to the detected position of the head 66.

In step 322, the controller 202 powers z-motor 83 to raise head 66. In step 324, the controller 202 powers x-motor 68 and y-motor 54 and returns the head 66 to the starting position. Of course, these steps can be performed simultaneously to the performance of step 320. In other embodiments, the steps 322 and/or 324 may be omitted if, for example, the player can continue playing and may direct the movement of the head 66 from its last position. In step 326, the controller determines whether the game is over. For example, in some embodiments, the player may get one or more additional chances to guide head 66 at video screen 36, such as in the dart game embodiment of FIG. 5. Or, the player may have targeted a bonus area during the game and may have been awarded additional chances to guide the head 66 and win an award. Or, in some embodiments, the player may be allowed to continue playing the game until an award is won. In yet other embodiments, the player might be required to control the head 66 multiple times in sequence to select particular highlighted targets in sequence. If the game is not over, the process returns to step 308 to continue the game and again allow the player to control the assembly 48 over the video screen 36.

If the game is over, the process continues to step 328, in which an award is dispensed to the player from dispenser 22 based on the game outcome. For example, tickets can be dispensed based on a game score, where a predetermined number of scored points is worth a predetermined number of tickets. Alternatively, the number of dispensed tickets can be based on the value of a prize that the player won during the game. Thus, if the player selected a stuffed bear, a number of tickets would be dispensed equal to the value of the bear. The player can then redeem the tickets at, e.g., a booth or vending machine to receive the won prize (or a different prize, if desired). Or, a voucher can be printed and dispensed from game apparatus 10 indicating to the player the prize that he or she has won by playing the game (e.g., "you have won a toy car"); this voucher would be redeemable at a prize booth or other provider and the player would receive the indicated prize from the provider. In yet other embodiments, the won prize(s) can be dispensed directly out of dispenser 22 of the game apparatus 10 instead of tickets.

The process is then complete at 330. Preferably, the process once again begins at 302, where the game apparatus waits for a coin to be inserted for the next game.

While this invention has been described in terms of several embodiments, it is contemplated that alterations, modifications and permutations thereof will become apparent to those skilled in the art upon a reading of the specification and study of the drawings. For example, a large variety of different target and prize images, screens, fields, and other zones which affect game play can be displayed by the video screen and be moved or changed during game play in various manners. Also, a variety of mechanisms can be used to position the device over a location of the displayed target area, to lower the head toward the screen, and to provide an award to the player.

It is therefore intended that the following claims include all such alterations, modifications and permutations as fall within the spirit and scope of the present invention.

What is claimed is:

1. A game apparatus comprising:

(a) a display device, said display device displaying images;

(b) a head moveable with respect to said display device;

(c) a sensor for detecting a location of said head with respect to said images displayed on said display device; and (d) a game controller for controlling said display of said images and for determining a game outcome based on said location of said head with respect to said images displayed by said display device.

2. A game apparatus as recited in claim 1, wherein said head is hammer shaped.

3. A game apparatus as recited in claim 1, wherein said head is essentially spherically shaped.

4. A game apparatus as recited in claim 1, wherein said sensor includes an optical detector positioned in said head.

5. A game apparatus as recited in claim 4, wherein said game controller determines said location of said head by determining which portion of an image was displayed on said display device when said optical detector senses electromagnetic radiation from said display device.

6. A game apparatus as recited in claim 1, wherein said sensor includes a grid of conductive lines coupled to a surface of said display device, such that said display device is a video touch screen.

7. A game apparatus as recited in claim 6, further comprising an activator provided in said head for allowing said conductive lines to sense contact with said head.

8. A game apparatus as recited in claim 1, wherein said sensor is capable of detecting said location of said head wirelessly.

9. A game apparatus as recited in claim 1 further comprising a dispenser for dispensing an award to a player of said game apparatus.

10. A game apparatus, comprising:

(a) a raster display device, said display device displaying at least one image;

(b) a head movable with respect to said display surface and having:

(i) a first sensor capable of detecting a raster signal; and (ii) a second sensor capable of detecting a contact signal; and (c) a processor coupled to said raster display device, said first sensor, and said second sensor to determine an engagement of said head with respect to said at least one image in response to said contact signal.

11. A game apparatus as recited in claim 10, wherein said head is hammer shaped.

12. A game apparatus as recited in claim 10, wherein said head is essentially spherically shaped.

13. A game apparatus as recited in claim 10, wherein said first sensor includes an optical detector.

14. A game apparatus as recited in claim 13, wherein said processor determines said engagement of said head by determining which portion of said at least one image was displayed on said display device when said engagement occurs.

15. A game apparatus as recited in claim 10, wherein said first and second sensors are capable of detecting said location of said head wirelessly.

16. A game apparatus as recited in claim 10 further comprising a dispenser for dispensing an award to a player of said game apparatus.

17. A method for providing a game for a player to select targets with a selection device and win an award, said method comprising:

displaying a target field with a display device, said target field including a plurality of target images;

allowing a player to influence movement of a selection head with respect to said target field;

determining a location in said displayed target field designated by said selection head when said selection head is moved to a selection position;

determining a game outcome based on said location in said target field designated by said selection head.

18. A method as recited in claim 17, wherein said head is hammer shaped.

19. A method as recited in claim 17, wherein said head is essentially spherically shaped.

20. A method as recited in claim 17, wherein said determining a game outcome includes selecting one of said target images which is displayed directly below said selection head when said selection head is moved to said selection position.

21. A method as recited in claim 20, wherein a prize is associated with said selected target, said associated prize being awarded to said player when said target is selected.

* * * * *